INVENTOR.
JAN A. RAJCHMAN
BY
Morris J. Rubin
ATTORNEY

MAGNETIC SWITCHING SYSTEMS

Original Filed Nov. 1, 1954 5 Sheets-Sheet 2

INVENTOR.
JAN A. RAJCHMAN
BY
Morris A. Rabkin
ATTORNEY

INVENTOR.
JAN A. RAJCHMAN
BY
Morris L. Rabkin
ATTORNEY

Dec. 29, 1959 J. A. RAJCHMAN 2,919,430

MAGNETIC SWITCHING SYSTEMS

Original Filed Nov. 1, 1954 5 Sheets-Sheet 4

INVENTOR.
JAN A. RAJCHMAN
BY
Morris Rabkin
ATTORNEY

MAGNETIC SWITCHING SYSTEMS

Original Filed Nov. 1, 1954

5 Sheets-Sheet 5

INVENTOR.
JAN A. RAJCHMAN
BY
Morris A. Rabkin
ATTORNEY 2,919,430
Patented Dec. 29, 1959

1

2,919,430

MAGNETIC SWITCHING SYSTEMS

Jan A. Rajchman, Princeton, N.J., assignor to Radio Corporation of America, a corporation of Delaware Original application November 1, 1954, Serial No. 465,842. Divided and this application May 25, 1956, Serial No. 587,386

18 Claims. (Cl. 340—174)

This invention relates to a magnetic system, and particularly to the control or the switching of electrical signals by means of such a system.

This application is a division of my copending application filed November 1, 1954, Serial No. 465,842, entitled "Magnetic Switching Systems," and assigned to the same assignee as the present invention.

Magnetic core elements are employed in the electrical arts to perform various control and switching functions. Magnetic cores are used as "and" gates; that is, the core is arranged to furnish a relatively large output signal in response to the simultaneous presence of a predetermined number of input signals of proper polarity and amplitude. Substantially no output signal is furnished in response to any number less than the predetermined number of input signals. Switching networks employing magnetic cores are also used in coding and decoding information represented by combinations of electrical signals.

In a copending application entitled "Magnetic Switching Systems," Serial No. 455,725, filed by Jan A. Rajchman and Arthur W. Lo, on September 13, 1954, there is described a "transfluxor." A transfluxor is useful, for example, in the control and the switching of electrical signals. The transfluxor includes a body of magnetic material having the characteristic of being substantially saturated at remanence. Two or more apertures and a plurality of distinct flux paths are provided in the body. A selected one of the flux paths includes two different portions of magnetic material. Each of the two portions is, respectively, in common with each of two other non-selected flux paths. By applying suitable excitation currents to windings linking the non-selected flux paths, the two common portions of the selected flux path can be set to the same or to opposite states of saturation at remanence. An A.C. (alternating current) signal is applied to an A.C. winding linking the selected flux path. When the two common portions are in the same state of saturation at remanence, an output signal is induced in the output winding by the A.C. signal. When the two common portions are in opposite states of saturation at remanence, no signal is induced in the output winding. Thus, the transfluxor can be considered to have two magnetic response conditions. In one of the responseconditoins, the A.C. input signal is blocked and, in the other response condition, the A.C. input signal is transmitted. The transfluxor "remembers" the response condition to which it is set for an indefinitely long period of time. Also, the transfluxor can be operated to its other response condition by a new input signal which is applied to one of the previously mentioned two input windings. No holding power is required by the transfluxor.

It is an object of the present invention to enhance the usefulness of magnetic control systems and switching networks by extending the application of the transfluxor in such systems and networks beyond its previous use.

Another object of the present invention is to provide a novel magnetic gate.

2

Still another object of the present invention is to provide an improved magnetic control system by means of which electrical signals are controlled without requiring holding power.

A further object of the present invention is to provide an improved and inexpensive magnetic system for switching electrical signals.

A still further object of the present invention is to provide an improved magnetic switching system useful in coding and decoding information.

Yet another object of the present invention is to provide an improved transfluxor.

The above and further objects of the invention are carried out by providing a body of magnetic material saturable at remanence. An output aperture and a plurality of input apertures are formed in the body. The input apertures are arranged in a cluster adjacent the output aperture. A portion of the magnetic material limiting each input aperture is common to a portion of the magnetic material limiting the output aperture. Thus, there is an individual flux path about each input aperture which has a portion in common with the flux path about the output aperture. At least one input winding individually links the flux path about each different input aperture. An output winding and an A.C. winding each link the flux path about the output aperture. The above arrangement can be considered a multi-input, magnetic "and" gate.

The multi-input gate operates in a manner similar to a transfluxor. When all the portions of the flux path about the output aperture are in one state of saturation at remanence with respect to the output aperture, an A.C. signal applied to the A.C. winding is transmitted to the output winding. When any two of the portions of the flux path about the output aperture are in states of saturation at remanence different from each other, the A.C. signal is blocked.

One explanation of the blocked condition is that postulated in the above-mentioned "Magnetic Switching Systems," application by Jan A. Rajchman and Arthur W. Lo. That is, the law of continuity of flux flow requires that an equal flux change must occur in every portion of the selected flux path in response to the A.C. signal. However, when one of the path portions is saturated with flux in a sense opposite to the sense of the flux in a different path portion, substantially no change of flux can be produced by either phase of the A.C. signal. The lack of flux change results because at least one of the portions is already saturated with flux in the sense in which the magnetizing force tends to increase the flux flow. Thus, in the blocked condition there is substantially no flux change and substantially no output voltage induced in the output winding.

Various embodiments of the multi-input "and" gate, and of systems employing this gate to provide switching, coding and decoding systems of the combinatorial type are described hereinafter. The input signals are stored without requiring holding power. The system may be arranged to furnish an output on one winding for one phase of an A.C. signal, and an output on a different output winding for the other phase of the A.C. signal.

The invention will be more fully understood, both as to its organization and method of operation, from the following description when read in connection with the accompanying drawing in which.

Figures 1, 2:
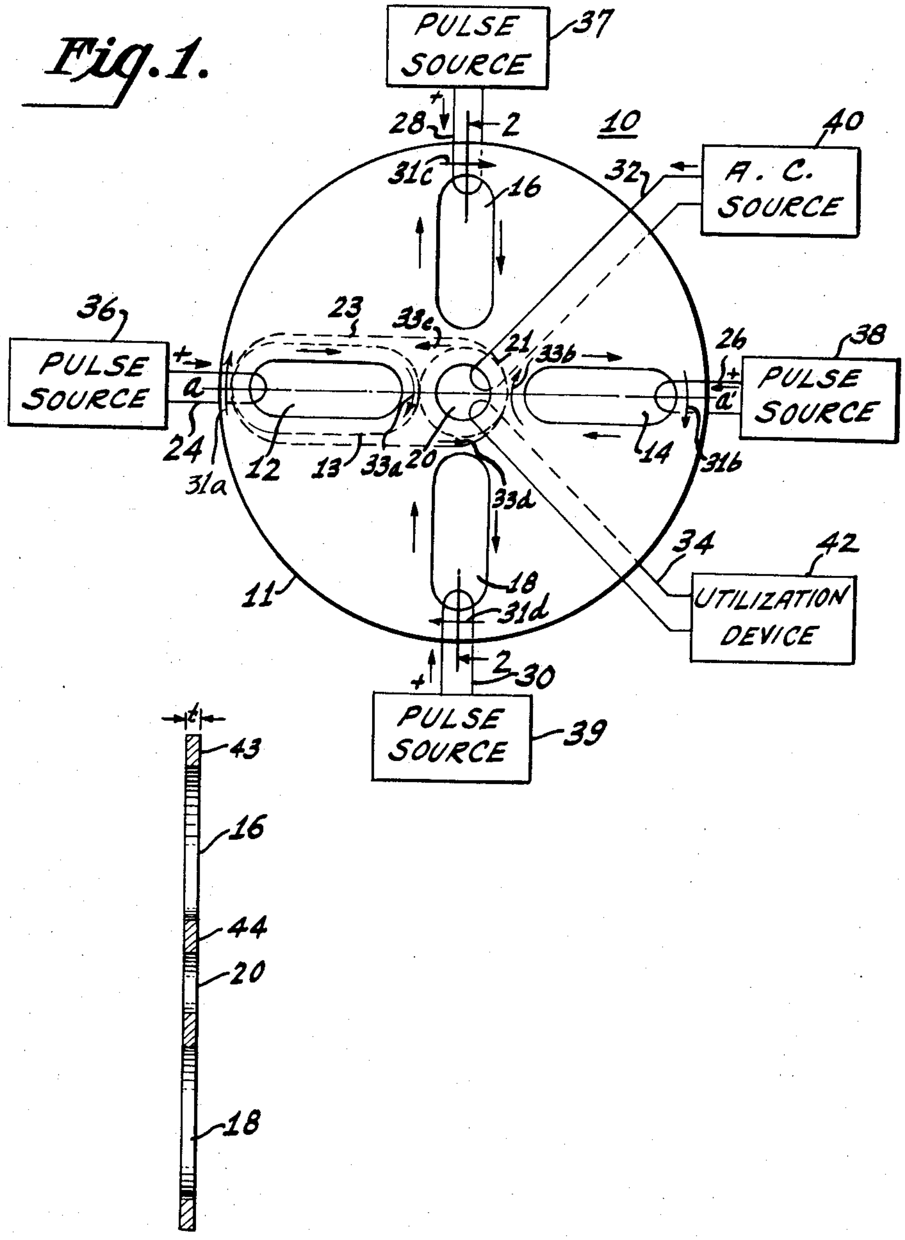
Fig. 1 is a schematic diagram of a magnetic system according to the invention in which a four-input transfluxor is shown in plan view.
Fig. 2 is a cross-sectional view along the line 2—2 of the transfluxor of Fig. 1.
Figure 3:
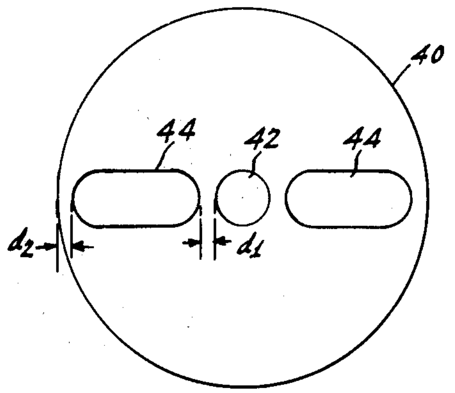
Figure 4:
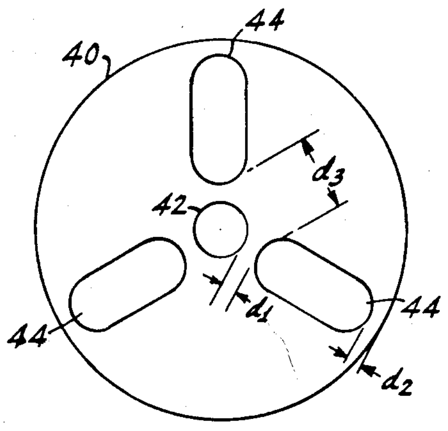
Figure 5:
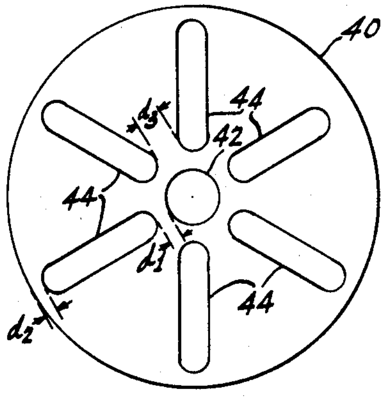
Figure 6:
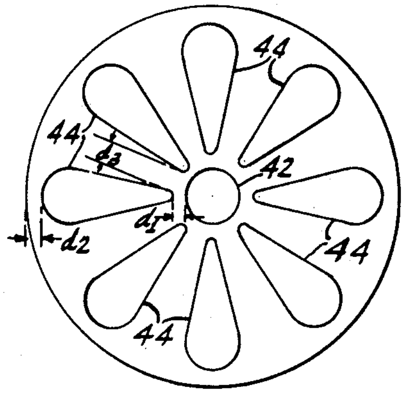
Figure 7:
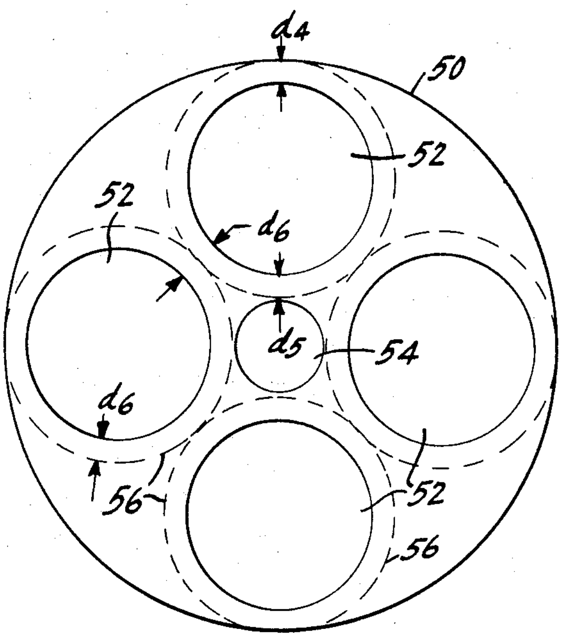
Figure 8:
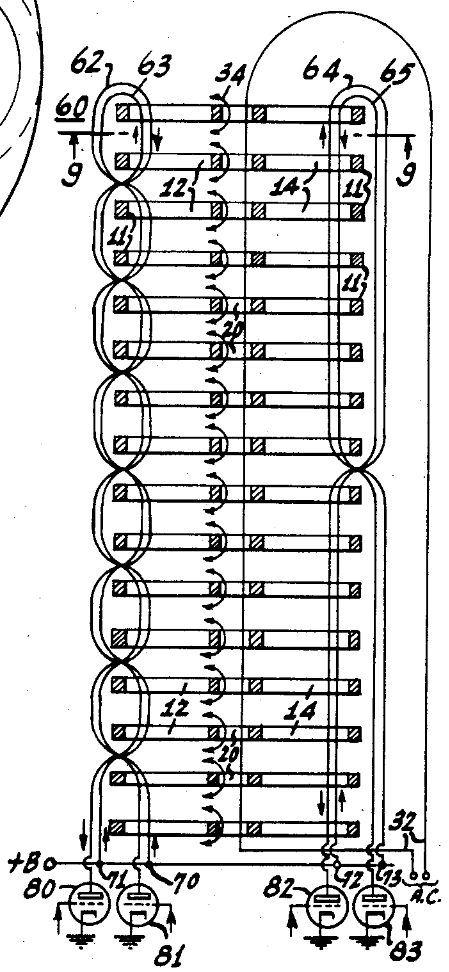
Figure 9:
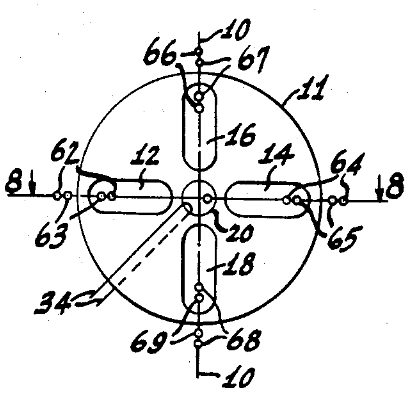
Figure 10:
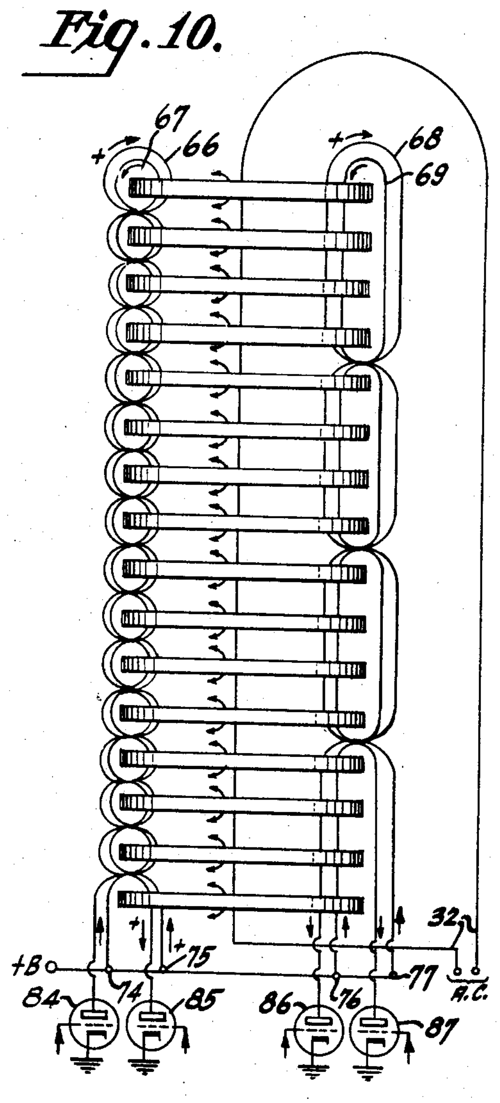
Figures 11, 12:
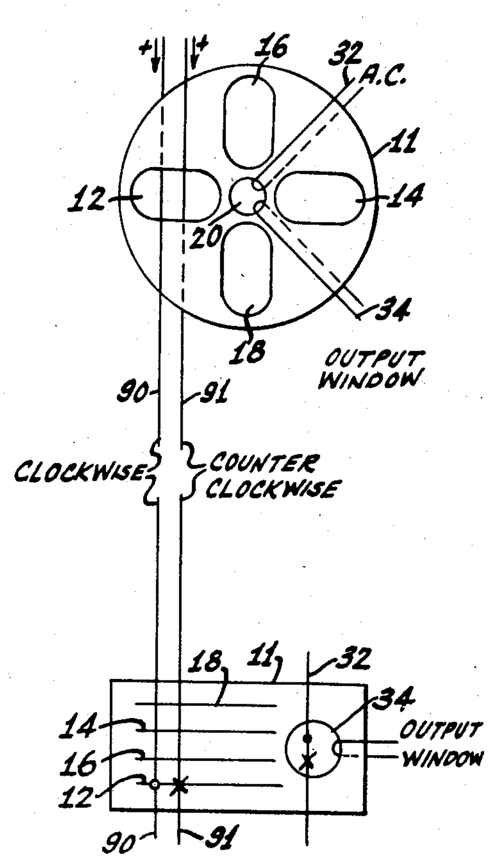
Figure 13:
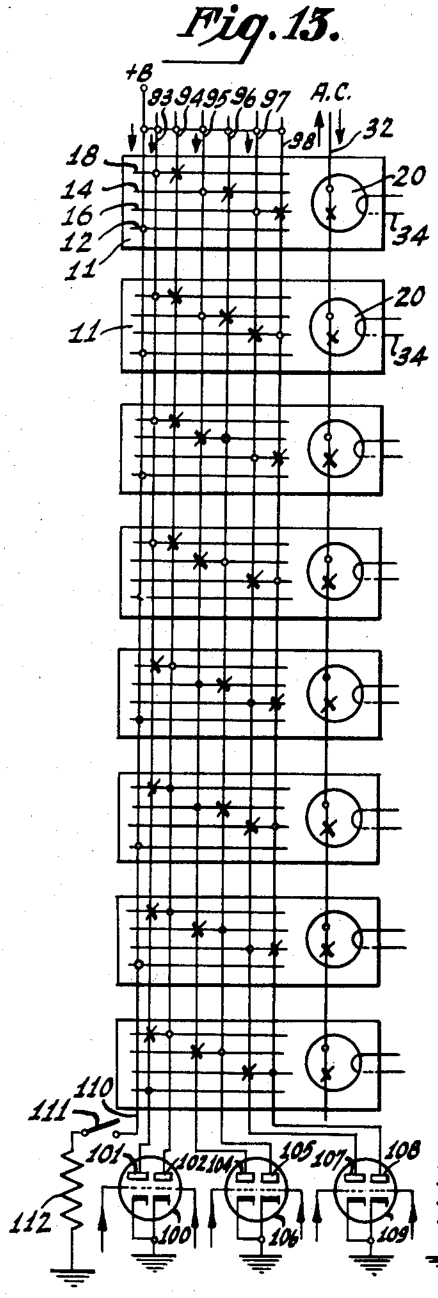
Figure 14:
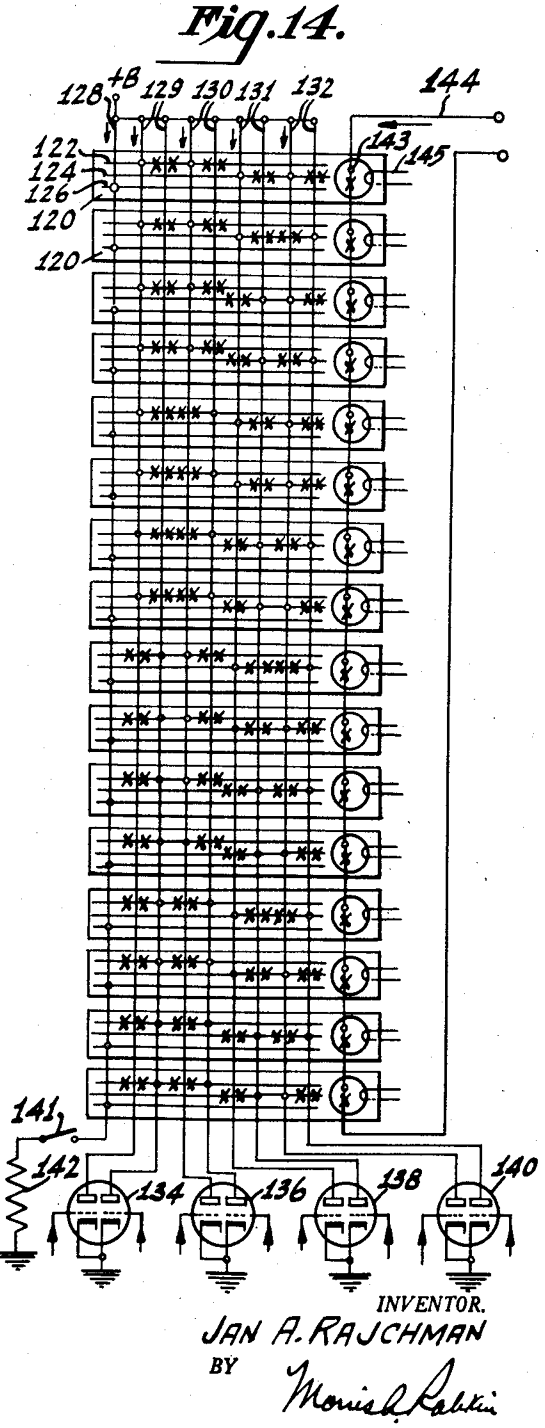

Figs. 3, 4, 5, and 6 are plan views of modified forms of transfluxors of the present invention having, respectively, two, three, six, and eight input apertures;

Fig. 7 is a plan view of another modified form of the transfluxor of the present invention in which all the apertures are circular;

Fig. 8 is a view in elevation of a switching network according to the invention with the transfluxors shown in cross-section along the line 8—8 of Fig. 9;

Fig. 9 is a cross-sectional view along the line 9—9 of the switching network of Fig. 8;

Fig. 10 is an end view of the switching network of Fig. 8 and shows the winding arrangement in the apertures along the line 10—10 of Fig. 9;

Fig. 11 is a plan view of a transfluxor useful in explaining a conventionalized showing in Fig. 12, and similar to that of Fig. 1 except that two input windings are shown schematically in a single input aperture and the others omitted;

Fig. 12 is a schematic diagram which may be used to represent a multi-input transfluxor according to the invention, and which adopts a convention for showing the sense of the windings;

Fig. 13 is a schematic diagram of a switching network according to the invention having a bias winding, and Fig. 14 is a schematic diagram of a combinatorial switch according to the invention using two pairs of windings threading certain input apertures.

Throughout the figures of the drawing, the same reference numbers are used to designate similar elements.

Referring to Fig. 1, there is shown a magnetic system 10 including a multi-aperture transfluxor 11 provided with input apertures 12, 14, 16, and 18 and an output aperture 20. Illustratively, the transfluxor 11 is fabricated in the form of a disc of magnetic material which is characterized by substantial saturation at remanence. The input apertures 12, 14, 16, and 18 are somewhat elongated along a radial line through the center of the output aperture 20 and are symmetrically arranged in a flower-like pattern about the circular-shaped aperture 20. The advantage derived from this particular shape and arrangement of the apertures is explained hereinafter.

The transfluxor 11 may be molded, for example, from a powder-like, manganese-magnesium ferrite and annealed at a suitable temperature to obtain the desired magnetic characteristics. Other magnetic materials having the characteristic of being substantially saturated at remanence may be employed. There is an individual, distinct flux path about each of the apertures. By way of example, one flux path about the input aperture 12 is represented by the dotted line 13. The flux path about the other input apertures is similar to the path 13. The flux path about the output aperture 20 is represented by the dotted line 21. In addition to the individual flux path about each of the apertures, there exists four longer flux paths which are presently of interest, each longer flux path being about both the output and one of the input apertures. One of these longer flux paths is represented by the dotted line 23 which includes both the input aperture 12 and the output aperture 20. Each of the respective flux paths about the input apertures 12, 14, 16 and 18 is respectively linked by one of the input windings 24, 26, 28 and 30. For example, the winding 24 is made to link the flux path 13 about aperture 12 by passing the winding 24 along the top surface of the disc 11, then down through the aperture 12, and then along the bottom surface of the disc 11. An A.C. input winding 32 and an output winding 34 link the flux path about the output aperture 20. The windings 32 and 34 are arranged to thread aperture 20 similar to the way in which winding 24, described in the above example, threads the aperture 12. The input and output windings are shown as single-turn windings for purposes of illustration. When desired, multi-turn windings may be employed. The pulse sources 36 through 39 are respectively connected to the input windings 24, 28, 26 and 30. Any suitable source of current pulses, for example, a current source with a vacuum tube control, may be employed. The current source, for example, may be in series with tubes connected in suitable switching circuits (not shown in detail) such as flip-flop circuits. The A.C. winding 32 is connected to a suitable source 40 of A.C. current. It is not necessary that the phases of the A.C. signal be periodic. The output winding 34 is connected to any utilization device 42 which is responsive to a voltage signal induced across the output winding 34.

Fig. 2 is a cross-sectional view along the line 2—2 of the transfluxor 11 of Fig. 1. The thickness $t$ of the disc 11 is substantially uniform throughout. It is not essential that the thickness of the disc 11 be uniform, as deviations in uniformity can be compensated for by differences in the area of the saturable legs. With a disc of uniform thickness, the distance 43 between the periphery of the disc 11 and the outer boundary of the input aperture 12 is substantially equal to the distance 44 between the outer boundary of the output aperture 20 and the opposite, inner boundary of the input aperture 12. Each of the remaining input apertures 14, 16, and 18 is similarly located between the output aperture 20 and the periphery of the disc 11.

The conventions regarding the sense of flux flow around a closed path, and the corresponding state of saturation of the magnetic material which were adopted in describing the operation of the transfluxors of the aforementioned "Magnetic Switching Systems" application, Serial No. 455,725, by Jan A. Rajchman and Arthur W. Lo, are retained herein. Briefly, there are two senses of flux flow around a closed path. A positive current flow through a surface bounded by the path produces a clockwise (as viewed from one side of the surface) flux flow around the closed path. One state of saturation at remanence, with reference to a closed flux path, is that in which the saturating flux is directed in a clockwise sense around the closed path; and the other state of saturation at remanence with reference to that path is that in which the saturating flux is directed in the counter-clockwise sense (as viewed from the same side of the surface) around the closed path.

The operation of the system of Fig. 1 is as follows: Assume that a positive excitation current is applied to the winding 24 by the pulse source 36. The direction of a positive current in the embodiment of Fig. 1, and also in the embodiments of the invention which are subsequently described, is indicated by an arrow marked with a plus sign adjacent the particular windings. The amplitude of this positive current is sufficient to establish a clockwise flux flow in the flux path 13 about the input aperture 12, as indicated by the solid arrows 31$a$ and 33$a$ along the path. The sense of flux flow in the portion of magnetic material common to the input aperture 12 and the output aperture 20 is clockwise with reference to input aperture 12 and counter-clockwise with reference to the output aperture 20, as represented by the arrow 33$a$. If a like, positive excitation is also applied by each of the pulse sources 37, 38, and 39 to the respective windings 28, 26, and 30, the sense of flux flow in all the portions in common with the output aperture flux path 21 is counter-clockwise, as indicated by the arrows 33$b$, 33$c$, and 33$d$. Therefore, all the common portions of the output aperture flux path are in the same state of saturation at remanence with reference to the output aperture 20. Under these conditions, a positive input current pulse of proper amplitude applied to the A.C. winding 32 by the A.C. source 40 reverses the sense of flux flow in all portions of the flux path 21 from the counter-clockwise sense to the clockwise sense with reference to output aperture 20. The following phase of the A.C. current in A.C. winding 32 then reverses the sense of flux flow in the path 21 back to the initial counter-clockwise sense. Each time the sense of flux in the flux path 21 is reversed, an output voltage is induced across the output winding 34. The reversal of the sense of flux flow in the flux path 21 can be carried out for an indefinitely long period of time.

Assume, now, that the sense of flux flow in the portions of the flux path 21 is returned to the counter-clockwise sense in the direction of the arrows 33*a* to 33*d*. Also, assume that a negative excitation current is then applied to input winding 30 by the pulse source 39. This negative, excitation current establishes a counter-clockwise flux flow about the input aperture 18 in a sense opposite arrows 31*d* and 33*d* adjacent thereto. The sense of flux flow in the portion of material common to input aperture 18 and output aperture 20, however, is clockwise with reference to aperture 20, in a sense opposite that of the arrow 33*d*. The sense of flux flow in the remaining three portions of the flux path 21 is still counter-clockwise with reference to aperture 20, in the direction of the arrows 33*a* to 33*c*. If, now, the positive input current is applied to winding 32 by A.C. source 40, there is substantially no reversal of the sense of flux flow in any of the portions of the flux path 21, because there are portions thereof saturated in opposite states of saturation at remanence. Likewise, there is substantially no reversal of the sense of flux flow in any of these portions when the negative input current is applied to winding 32. Consequently, no output voltage is induced across output winding 34 when the A.C. excitation is applied.

Further, assume that a negative excitation current is now applied to the winding 28 to establish a counter-clockwise flux about aperture 16, opposite the arrows 31*c* and 33*c* adjacent thereto. The sense of flux flow in the portion of material in common with the apertures 16 and 20 is clockwise with reference to aperture 20, in a sense opposite that of the arrow 33*c*. Again, there is substantially no reversal of the senses of flux flow in the flux path 21 in response to either phase of the A.C. input signal. The non-reversal results because two of the common portions of the flux path 21 are saturated in the state of saturation at remanence opposite to the state of saturation at remanence of the other two common portions.

Similarly, if a negative excitation current is applied to the input winding 26 by the pulse source 38, a counter-clockwise flux flow is established about aperture 14 in the direction opposite to arrows 31*b* and 33*b* adjacent thereto. Hence, the sense of flux flow in the portion of magnetic material common to the input aperture 14 and the output aperture 20 is clockwise with reference to aperture 20, opposite the direction of the arrow 33*b*. Neither the positive nor the negative phase of the input A.C. signal reverses the senses of flux flow in the flux path 21 because the one portion common to apertures 12 and 20 is saturated at remanence in the state opposite to that of the other three common portions.

If, now, a negative excitation current is applied by the pulse source 36 to the input winding 24, all the common portions of the flux path 21 are saturated with flux in the clockwise sense (opposite the arrows 33*a* to 33*d*) with reference to aperture 20. Therefore, the first succeeding negative phase of the A.C. signal current in winding 32 reverses the sense of flux flow in the path 21 to the counter-clockwise sense with reference to the output aperture 20. The following positive phase of the A.C. signal then reverses the sense of flux flow in the path 21 back to the initial clockwise sense, and so on for an indefinite number of negative and positive phases. The reversal of flux flow in the path 21 occurs because all its portions are saturated in the same state of saturation at remanence. Upon each reversal of flux along the path 21 about the output aperture 20, there is an output voltage induced across the output winding 34.

The magnetic system of Fig. 1, then, can be considered as a four-input, magnetic "and" gate. The gate is primed when four input signals of proper polarity and amplitude have been applied to the different input windings. Note that the four input signals can be applied in any order. Because each input signal causes a substantial flux flow only about the corresponding input aperture, only the common portion of the flux path limiting this input aperture is affected by this flux flow. The gate is blocked when any two of these common portions are saturated in opposite senses with reference to the output aperture.

There are several important advantages in the magnetic system of Fig. 1. Firstly, the input signals need not occur concurrently, that is, within a specified time interval, as is the case with prior "and" gate elements. Therefore, in asynchronous systems, the requirement for additional staticizers or storing registers to hold one signal until another occurs may be eliminated. Secondly, the input signal does not affect the output circuit, because only one of the common portions of the output aperture flux path is changed by any one input signal. Likewise, the A.C. signal does not affect the input circuit because only the flux flow in the output aperture flux path is reversed by the A.C. signal. Therefore, the read-in and read-out of the information stored in the magnetic gate are virtually independent of each other. As an incident, therefore, the impedances of the input and output circuits need not be matched. Thirdly, once the gate is primed, the A.C. signal can be applied for an indefinitely long period of time without affecting the stored signals. Therefore, additional resetting or restoring circuits are not required as in the case of prior magnetic core devices which, unless such additional circuits are provided, retain the stored signal only until a reading signal is applied. Furthermore, the system of Fig. 1 remains in the primed or set condition without requiring holding power.

The system of Fig. 1 can also be considered as a control system which is operated by positive and negative polarity input signals. For instance, assume that an input signal is applied to each of the input windings, following which the A.C. signals are applied to the A.C. winding. If the four input signals were of the same polarity, the A.C. signals are transmitted to the output circuit. If any two of the input signals are of different polarities, the A.C. signals are "blocked" from the output circuit. It is not necessary to apply the controlling signals in any given time sequence. The transfluxor stores each previously applied input signal, and the saturation at remanence of each common portion remains set by the initial input signal unless a different polarity signal is applied to an input winding, thereby changing the saturation at remanence of a common portion. For example, assume that three like, polarity signals are applied to three of the input windings and a sequence of input signals is then applied to the fourth input winding. If, now, the A.C. signals are applied to the A.C. winding subsequent to each pulse of the sequence, the A.C. signals will or will not be transmitted to the output winding in accordance with the polarity of each pulse of the sequence. If the input pulse of the sequence is of the same polarity as the other three input pulses, the A.C. signal is transmitted, otherwise, the A.C. signal is "blocked." Note that, if desired, a multi-input transfluxor can be operated with two or more of the inputs serving to control the transmission of the A.C. signal. The remaining inputs are then null inputs. However, unlike electronic or prior magnetic devices, it is not necessary to change a bias potential or the amplitude of the input signals when less than all the inputs are used as control inputs. Thus, the multi-input transfluxor is more versatile in that the number of controlling signals can be changed at any time without altering its operation in any respect.

It is also possible to determine the polarity of the input signals. For example, if the input signals are of a positive polarity, the first positive phase of the A.C. signal causes a flux reversal; whereas if the input signals are of a negative polarity, the first negative phase of the A.C. signal causes a flux reversal. Therefore, the first phase of the A.C. signal which causes a voltage to be induced in the output winding can be related to the polarity of the input signals.

In designing a transfluxor similar to the flower-like arrangement of the disc 11, certain dimensions and properties should be considered. For example, assume that the transfluxor is blocked by means of applying a negative excitation current to the input winding 24. The sense of flux flow in the three common portions adjacent the apertures 14, 16, and 18 is then counterclockwise with reference to aperture 20 as indicated by the solid arrows 33*b*, 33*c*, and 33*d* in these respective portions. The sense of flux flow in the common portion adjacent aperture 12 is clockwise, in the direction opposite the arrow 33*a* in this portion, with reference to aperture 20.

Assume, now, that an intense, positive current pulse is applied by A.C. source 40 to winding 32. The magnetizing force exerted by this positive pulse cannot cause a reversal of flux flow in the path 21 because of the clockwise flow with reference to aperture 20 in the portion adjacent aperture 12. However, the magnetizing force can conceivably cause a flux reversal along the longer flux path 23 which encompasses the two apertures 12 and 20. The flux could reverse along the longer path 23 because of the counter-clockwise flux flow with reference to the aperture 20 in the portion of the material limiting aperture 12, that is, in a direction opposite arrow 31*a*. The approximation that the magnetizing forces exerted along a flux path are inversely proportional to the length of the path is reasonable in the case of the magnetic materials in question. Such an approximation is sufficiently accurate to serve as the basis for the design of apparatus. Consider the relatively short path 21 around the aperture 20, and the relatively long path 23 around both the apertures 12 and 20 with respect to the above approximation. The amplitude of the A.C. current pulses applied to the winding 32 are regulated such that there is sufficient magnetizing force to cause a reversal of the sense of flux flow around the aperture 20, but insufficient to cause a reversal of the sense of flux flow in the longer path 23. Thus, when any two common portions have opposite senses of flux flow, as by applying a negative, current excitation to one input winding, the gate remains unresponsive to the A.C. current pulses because no reversal occurs in the sense of flux flow in either the flux path 21 or the flux path 23. The range of permissible variation in the amplitude of the A.C. current pulses is, therefore, a function of the ratio of the length of the flux path 23 to the length of the flux path 21. By providing the input apertures with the elongated shape described, the above ratio is increased to a relatively large value.

Accordingly, the maximum amount of useful load current which can be furnished may be calculated on the basis of the above-mentioned approximation and on the basis of the ratio between the length of the longer path 23 and the length of the shorter path 20.

As a result of the longer path around the input apertures, the ratio between the length of the longer flux path 23 and the length of the flux path 13 about an input aperture becomes close to unity. It would appear from this arrangement that the amplitude of the setting current pulses applied to an input winding is very critical because the amplitude of a setting pulse must be sufficient to cause a flux reversal in the path 13, but not sufficient to cause a flux reversal in the path 23. If the setting pulse caused a flux reversal along the path 23, the transfluxor might be blocked when it should not be. For example, if a positive setting pulse were first applied to the winding 26, the common portion adjacent aperture 14 would have a flux flow in the counter-clockwise sense around the aperture 20. Now, if a positive, setting pulse applied to the winding 24, were of an amplitude sufficient to cause a flux flow both in the shorter path 13 and the longer path 23, then the flux flow in the common portion adjacent aperture 12 would be in a counter-clockwise sense with reference to the aperture 20. The flux flow in the common portion adjacent aperture 14 would be reversed to a clockwise sense with reference to the aperture 20. Therefore, no matter what polarity current pulses were applied to windings 28 and 30, the transfluxor would be in the blocked condition.

The above possibility of faulty operation of the transfluxor is prevented by making the distance 43 of Fig. 2 equal to the distance 44. Thus, referring to Fig. 1, the minimum cross-sectional area of the material between the periphery of the disc 11 and any one of the input apertures, such as 12, is equal to the minimum cross-sectional area of the common portion of the material between the inner surface of an input aperture and the wall of the output aperture 20. Again the thickness of material is assumed to be uniform.

Consider the flux changes resulting from a sharp rising current pulse applied to the winding 24 as this current pulse increases from zero value to its maximum amplitude. Although the rise time of the pulse is extremely short, it is far from being instantaneous. Therefore, the magnetizing force exerted along the path 13 is greater than the magnetizing force exerted along the longer path 23. Accordingly, the flux change first occurs in the common portion adjacent aperture 12 and increases with the current rise until this common portion is saturated. That is, the state of saturation of the common portion adjacent to the aperture 12 is reversed. A further increase in current produces substantially no change of flux in the diametrically opposite common portion adjacent to the aperture 14. The failure to produce a flux change in this latter common portion results from the fact that substantially no further flux change is possible in the portion of material located between the periphery of the disc 11 and the outer wall of aperture 12. Thus, the total possible flux change in the flux paths 13 and 23 is determined by the minimum cross-sectional area of the outer portion of material limiting the aperture 12. Accordingly, the flux in the common portion adjacent aperture 12 is completely reversed, and substantially no flux change occurs in the diametrically opposite common portion. Any flux change which occurs in the longer path 23 causes a corresponding output voltage to be induced in output winding 34. However, it is known that a current flow in the load circuit tends to oppose any change of flux produced by the input current. Therefore, any loading of the output circuit aids in preventing a flux change in the longer path 23.

An additional design consideration related to the fabrication of the flower-like transfluxors is the minimum cross-sectional area of the material between two adjacent input apertures. This first minimum cross-sectional area should be equal to or greater than twice a second, minimum cross-sectional area of the magnetic material limiting an input aperture. The second area is a cross-sectional area taken at a line through the limiting material of the aperture 20 at the most restricted portion, such as the line *a*—*a'* of Fig. 1. The reason for this consideration is that the first area must be able to accommodate the sum of the flux changes due to inputs causing flux changes about each two adjacent input apertures. For example, when a flux flow is established about aperture 12, the total flux change is determined by the minimum cross-sectional area of the common portion adjacent thereto. The same flux change occurs when a flux is established about aperture 16. The first minimum cross-sectional area of the material between the apertures 12 and 16 should be able to accommodate the total of both these flux changes. The need for the accommodation is because the flux change in this first area, due to an input current applied to the winding 24, is in the clockwise sense with reference to aperture 12, and the flux change in this first area, due to an input current applied to the winding 28, is in the counter-clockwise sense with reference to aperture 12. Therefore, the flux due to the two inputs is in opposite directions in this first area which area should be adequate to accommodate the total flux change.

A flower-like transfluxor having *n* input apertures and a single output aperture may be provided. Such a transfluxor can be considered to correspond to an *n* input control circuit or to an *n* input magnetic "and" gate. Referring to Figs. 3, 4, 5 and 6, there are respectively shown a flower-like transfluxor 40 having two, three, six, and eight input apertures 44 and a single output aperture 42. In each of these arrangements of a transfluxor 40, the cross-sectional width *d*1 of material at the most restricted part of a common portion is equal to the cross-sectional width *d*2 of the most restricted part of the portion between the outer edge of an input aperture 44 and the periphery of the transfluxor 40. Likewise, the cross-sectional width *d*3 at the most restricted portion of the cross-sectional area between two adjacent input apertures 44 is equal to or greater than a distance 2*d*1. The manner of operating the flower-like transfluxors of Figs. 3, 4, 5, and 6 is the same as that described in connection with Fig. 1. At least one input winding is provided for each different input aperture. An interrogating winding 32 and an output winding 34 may be provided for the central aperture 42.

The input apertures of the multi-input transfluxors can be shaped differently from the somewhat radially elongated shape previously described. For example, in Fig. 7, a modified form of a multi-input transfluxor 50 is provided with circular-shaped input apertures 52, and a circular-shaped output aperture 54 in a disc of uniform thickness. The flux path 56, individually about each of the input apertures, is indicated by the dotted lines about the respective apertures 52. The distance *d*4 between the periphery of the transfluxor 50 and the outer boundary of an input aperture 52 is equal to the distance *d*5 between the inner boundary of an input aperture 52 and the boundary of the output aperture 54. The smallest distance *d*6 between any two adjacent apertures is equal to a value of 2*d*5.

*Arrangement of multi-input transfluxors to form a switching network*

A large number *n* of the multi-input transfluxors can be arranged as a combinatorial switch having *n* inputs and $2^n$ outputs. In an application by this inventor entitled "Magnetic Matrix and Computing Devices," Serial No. 275,622, filed March 8, 1952 (now Patent No. 2,734,182, issued February 7, 1956), there are described various switching devices using a plurality of magnetic core elements and a plurality of coils. For example, each of the coils may be inductively coupled to different ones of the cores by windings, in accordance with a desired combinatorial code, such as a binary code. Each core has an output winding. Means are provided to apply current selectively to said coils so that, when all the windings that are wound in the same sense on a desired one of said cores are excited, the magnetic condition of only that one element is altered. A voltage is induced in its output winding when the magnetic condition of the core is altered.

Referring to Fig. 8, there is shown a schematic diagram of a combinatorial switch 60 according to the present invention. The switch 60 is provided with sixteen different, four-input disc transfluxors 11 shown in cross-section along the line 8—8 of Fig. 9 which may, conveniently, be arranged coaxially. One transfluxor 11 is shown in the view of Fig. 9, which is a cross-sectional view along the line 9—9 of Fig. 8. The input aperture 12 of each of the transfluxors 11 is threaded by two separate input windings 62 and 63. The input aperture 14 of each of the transfluxors 11 is threaded by another two separate input windings 64 and 65. One terminal of the winding 62 is connected to the anode of a driving tube 80; one terminal of the winding 63 is connected to the anode of a driving tube 81; one terminal of the winding 64 is connected to the anode of a driving tube 82, and one terminal of the winding 65 is connected to the anode of a driving tube 83. The other terminal 70, 71, 72, and 73 of each of the respective windings 62, 63, 64, and 65 is connected to the B+ bus of a power supply (not shown). The cathode of each of the driving tubes 80, 81, 82, and 83 is connected to common ground. An A.C. input winding 32 is threaded through the output aperture 20 of each of the transfluxors 11. A different output winding 34 is threaded through each output aperture 20 of each of the transfluxors 11. The various windings are shown in Fig. 9 in full cross-section although in Fig. 8, for purposes of clarity, the windings are indicated only by lines.

Fig. 10 is an end view of the switch 60 and shows the winding arrangement in the other two input apertures 16 and 18 of the transfluxors 11. The input aperture 16 of each of the transfluxors 11 is threaded by two different input windings 66 and 67. The input aperture 18 of each of the transfluxors 11 is threaded by two other different input windings 68 and 69. One terminal of the winding 66 is connected to the anode of a driving tube 84; one terminal of the winding 67 is connected to the anode of a driving tube 85; one terminal of the winding 68 is connected to the anode of a driving tube 86, and one terminal of the winding 69 is connected to the anode of a driving tube 87. The other terminal 74, 75, 76 and 77 of the respective windings 66, 67, 68 and 69 is connected to the B+ bus of a power supply. The cathode of each of the driving tubes is connected to the common ground. The power supply for the driving tubes of Figs. 8 and 10 may be a conventional electronic power supply.

In the arrangement of the sixteen transfluxors of Figs. 8 and 10, to select any desired transfluxor 11, the sense of flux flow in the four common portions of the flux path about aperture 20 is established in a given sense in the selected transfluxor 11 with reference to the output aperture 20 of that transfluxor. The sense of flux flow in one or more of the four common portions of the flux path about the aperture 20 of the fifteen nonselected transfluxors is established differently from a given sense with respect to the aperture 20 of each non-selected transfluxor.

A binary number having four binary digits uniquely determines any one of sixteen different signals. Each of the four input apertures of each of the sixteen transfluxors 11 is assigned to correspond to a digit in a different position in the four-digit, binary number. One of the input windings threading any input aperture tends to produce a flux flow in a given sense, and the other input winding tends to produce a flux flow in the sense opposite to the given sense. The apertures 14 may be taken as being in the first binary position. The transfluxors are interleaved in halves by the input windings 64 and 65 threading the apertures 14. Thus, in the apertures 14, the winding 65 is threaded from terminal 72 upwardly (as viewed in Fig. 8) through the input apertures 14 of the bottom eight of the transfluxors 11, then around the edges of the upper eight of the transfluxors 11, and then downwardly through the input apertures 14 of the upper eight transfluxors 11, and then around the edges of the lower eight to the anode of tube 83. Beginning at the terminal 73, the winding 64 is threaded around the edges of the bottom eight of the transfluxors 11, then upwardly through the input apertures 14 of the top eight of the transfluxors 11, then around the edges of the top eight of the transfluxors 11, and then downwardly through the input aperture 14 of the bottom eight transfluxors to the anode of tube 82. The apertures 18 may be considered as in the second binary position. The input apertures 18 of the transfluxors 11 are interleaved in consecutive quarters of the sixteen (that is, four at a time in one sense) by the input windings 68 and similarly by the input winding 69.

The apertures 12 may be considered as in the third binary position. The input apertures 12 are interleaved in consecutive eights (of the sixteen) by the two windings 62 and 63. The apertures 16 may be considered as in the fourth binary position which is, therefore, in this case, the least significant position. The input apertures 16 of the transfluxors 11 are interleaved in consecutive sixteenths of the sixteen, that is, each is consecutively interleaved by the two windings 66 and 67.

Only one tube of each of the four pairs of tubes is rendered conducting at any one time for selecting a particular one of the transfluxors 11. The positive direction of current flow in the various windings is shown by the arrows adjacent each winding. Assume, now, that tubes 80 and 83 of Fig. 8, and tubes 84 and 87 of Fig. 10 are rendered conducting. Current flows in the individual windings 62, 64, 66 and 69 when these respective tubes draw current. A positive current flows downwardly through each of the input apertures of only the uppermost transfluxor 11. Therefore, a counterclockwise flux, with reference to aperture 20 (viewing all of the transfluxors from the top, as shown in Figs. 8 and 10) is established in the four common portions of the flux path about the output aperture 20. Note that a positive current flows upwardly through each of the input apertures of the lowermost transfluxor 11. Therefore, a clockwise flux, with reference to its aperture 20 (as viewed from above), is established in the four common portions of the flux path about the output aperture 20. The senses of flux flow, with reference to the output aperture 20, in the common portions of the flux path about the output aperture 20 in the remaining transfluxors, is mixed, i.e., the flux is clockwise in certain of the common portions and counterclockwise in the remaining common portions.

The first positive phase of the A.C. signal applied to the A.C. winding 32 reverses the sense of flux flow in the path about the output aperture 20 of the uppermost transfluxor 11. Therefore, a voltage is induced only in the output winding 34 which threads this aperture. The following negative phase of the A.C. signal reverses the sense of flux flow in the path about output aperture 20 of both the uppermost and the lowermost of the transfluxors 11. The sense of flux flow in the path about the output aperture 20 of the uppermost transfluxor 11 is reversed back to its initial counterclockwise sense. The sense of the flux flow in the path about the output aperture 20 of the lowermost aperture is reversed, for the first time, to the counterclockwise sense. Each succeeding phase of the A.C. signal produces an output on the different output windings 34 of the uppermost and the lowermost transfluxors 11 while the remaining transfluxors are blocked.

Nevertheless, when only the first A.C. pulse is considered, this combinatorial switch selects one out of the $2^n$ transfluxors for any combination of input signals. The next succeeding A.C. pulse selects both the transfluxor, which corresponds to a given binary combination, and another transfluxor which corresponds to the complement of the given binary combination. The use of vacuum tubes to provide the driving currents is illustrative only. Other driving means, such as pairs of magnetic cores or other transfluxor elements, may be employed to furnish the required input currents.

*Modification of switching network to provide single output*

A combinatorial switch employing a plurality of the multi-apertured transfluxors, for example, like that of Figs. 8 to 10, may be modified so that only one transfluxor is selected to furnish an output signal in response to the A.C. while all the remaining transfluxors are blocked for both phases of the A.C. signal. This modification consists of "setting" the common portion adjacent one of the input apertures of each transfluxor, such that the flux flow therein is permanently in one sense. Thus, for example, the common portion adjacent an input aperture 12 of each transfluxor 11 of Figs. 8 to 10 may be "set" in the clockwise sense with reference to the individual output aperture 20. This "set" common portion then serves as a bias for the respective transfluxors. Thus, a selected one of the transfluxors is unblocked only when the flux flow in the remaining three common portions is also in the clockwise sense with reference to its output aperture.

In Fig. 11, a four-input transfluxor 11 is shown in plan view. Two input windings 90 and 91 link the flux path about the input aperture 12. Note that the winding 90 is brought from its positive terminal along the bottom surface of the transfluxor 11, then upwardly through aperture 12, and then along the top surface of the transfluxor 11 to its negative terminal. The winding 91, on the other hand, is brought along the top surface of the transfluxor from its positive terminal, then downwardly through aperture 12, and then along the bottom surface of the transfluxor 11. Therefore, when the positive terminal of a current source is connected, as shown, to the top of winding 90 (as viewed in the drawing) and the negative terminal of the source is connected to the bottom of the winding 90, a counterclockwise flux is established about the input aperture 12. Accordingly, the sense of flux flow in the common portion adjacent aperture 12 is clockwise with reference to output aperture 20. When a similar current source is connected to the winding 91 in a like fashion, the sense of flux flow in the common portion, with reference to the output aperture 20, is counterclockwise. An A.C. winding 32 and an output winding 34 link the flux path about the output aperture 20.

Fig. 12 is a schematic representation of the four-input transfluxor of Fig. 11. The corresponding parts are designated by like reference numerals. At the intersection of the horizontal line which represents an input aperture, and the pair of vertical lines which represent the input windings threading this aperture, there is marked either an X or a circle (○). The X indicates that the input winding is threaded through an input aperture such that the sense of flux flow in the common portion is clockwise with reference to the output aperture 20 when the input winding is energized by a current source whose positive terminal is connected to its top. The circle nidicates that the input winding is threaded through an input aperture such that the sense of flux flow in the common portion adjacent the input aperture is counterclockwise with reference to the output aperture 20 when the top of the input winding is connected to the positive terminal of the current source. The circle located above the X on the line representing the A.C. winding 32 in the output aperture 20 indicates that the A.C. signal is applied to the winding 32 so as to produce first a counterclockwise flux about the output aperture 20, and then a clockwise flux about the output aperture 20.

Fig. 13 is a schematic representation of a combinatorial switch using the schematic representation of Fig. 12 for the four-input transfluxors. Input aperture 12 is used as a bias aperture. Each of the three apertures 14, 16, and 18 are assigned a respective binary position, as in the case of the switch embodiment described in Figs. 8 and 10. Thus, because one input aperture is used for biasing, the embodiment of Fig. 13 is able to select one out of $2^{(n-1)}$ outputs for $n$ input apertures. The top (as viewed in Fig. 13) terminals of the three pairs of windings 93 and 94, 95 and 96, and 97 and 98 are connected to the B+ terminal of a conventional power supply. In Fig. 13, each winding of a pair is threaded through any aperture of a transfluxor in the sense opposite to that in which the other winding is threaded. Therefore, it is sufficient to describe the manner in which only one winding of each pair is threaded. Winding 93 of the first pair of windings 93 and 94 is threaded from the B+ supply in one sense, indicated by circles, through the aperture 18 of the upper four transfluxors and, in the other sense, through the aperture 18 of the lower four transfluxors. Winding 95 of the second pair 95 and 96 is threaded in the one sense, indicated by the circles, through the apertures 14 of the upper two transfluxors, and then through apertures 14 of the lower transfluxors, reversing the sense of coupling for each succeeding lower two transfluxors. The winding 97 of the third pair of windings 97 and 98, starting from the uppermost transfluxor 11, is threaded in the one sense, as indicated by the circle through the aperture 16, and then is threaded through the remainder of the apertures 16, reversing the sense of coupling for each succeeding lower transfluxor. The lower terminals of the three pairs of windings 93, 94; 95, 96, and 97, 98 are connected respectively to the anodes 101, 102; 104, 105, and 107, 108 of the three pairs of tubes 100, 106, and 109. The tube cathodes are connected to a common conductor, indicated by the conventional ground symbol.

The top terminal of a bias winding 110 is connected to the $B^+$ terminal of the power supply. After threading through the input aperture 12 of each of the transfluxors 11, in the same one sense, as indicated by the respective circles, the other terminal of the winding 110 is connected to the fixed terminal of a single-pole, single-throw switch 111. The movable terminal of the switch 111 is connected in series with a current-limiting resistor 112 to ground. The A.C. winding 32 is threaded through the output aperture 20 of each of the transfluxors 11. The terminals of the winding 32 are connected to a suitable source (not shown) of A.C. current. An individual output winding 34 is threaded through each output aperture 20 of each of the transfluxors 11. Each output winding 34 may be connected to any device to utilize the output voltage induced in an output winding when the sense of flux flow in the flux path about the output aperture 20 is reversed by the A.C. signal.

In operation, the movable arm of the switch 111 may be closed and then opened to produce a current pulse in the winding 110. This current pulse establishes a clockwise flux in the common portion adjacent the bias aperture 12 of each of the transfluxors 11, as indicated by the respective circles at the intersection of the winding 110, and the various horizontal lines representing the input apertures 12. The three duo-triodes 100, 106, and 109 each control one binary position. Only one side of each of the duo-triodes is rendered conducting at any one time. Assume that the left side of each of the duo-triodes is rendered conducting by a combination of input pulses applied to their respective control grids. The conduction of these triodes respectively cause a positive current pulse to flow in each of the input windings 93, 95, and 97 in the direction of the arrows adjacent thereto. Only the top transfluxor 11 has a clockwise flux with reference to the output aperture 20 established in the four common portions. All the remaining transfluxors 11, including the bottom transfluxor, are in the blocked condition. The first positive phase of the A.C. signal reverses the sense of flux flow in the path about aperture 20 of the top transfluxor to the counterclockwise sense, and the following, negative phase returns the sense of flux flow in the path about output aperture 20 to the clockwise sense. Each reversal of flux in the path about the output aperture 20 induces a voltage in the output winding 34.

By varying the combination of input signals applied to the control grids of the duo-triode tubes 100, 106, and 109, any given one of the transfluxors can be selected in a manner similar to the selection, just described, of the top transfluxor of Fig. 13. The combination of input signals can be applied in any order because the transfluxor "remembers" each input signal until a new input signal is applied to the same winding.

Each of the input apertures of a multi-input transfluxor can be used as an individual coincident-current "and" gate; that is, a plurality of input leads are threaded through each input aperture. The amplitude of the current pulses individually applied to the input leads is regulated so that a predetermined number of input signals must be simultaneously present before a saturating flux is established in the common portion adjacent the aperture threaded by these windings.

Fig. 14 is a schematic drawing of a modification of the invention which employs each of two of the input apertures of a three-input transfluxor as a coincident-current gate. Sixteen different transfluxors 120, each having three different input apertures 122, 124 and 126, are arranged in a sixteen-way combinatorial switch. Two different pairs of input windings 129 and 130 are threaded through each of the input apertures 122. Two other different pairs of input windings 131 and 132 are threaded through each of the input apertures 124. One winding of each different pair is linked to the flux path about a respective input aperture of each transfluxor in the sense opposite to that in which the other winding of the pair is linked. The two X's, which are placed on the horizontal line representing an input aperture, are used to indicate that this winding of the pair has more turns linking the flux path about the aperture than has the other winding of the pair. The manner in which only one winding of each pair is threaded will be described, it being understood that the other winding of the pair is threaded in the opposite sense. One winding of the first pair of windings 129 is threaded from the $B^+$ supply in one sense, indicated by circles, through the aperture 122 of the upper eight transfluxors, and in the other sense through the aperture 122 of the lower eight transfluxors. One winding of the pair of windings 130 is threaded from the $B^+$ supply in one sense, indicated by the circles, through the aperture 122 of the upper four transfluxors and, in the other sense, through the aperture 122 of the lower four transfluxors, and so on for each succeeding four transfluxors. One winding of the pair of the windings 131 is threaded from the $B^+$ supply in one sense, indicated by the circles, through the aperture 124 of the upper two transfluxors and, then, through the apertures 124 of the lower transfluxors, reversing the sense of linkage for each succeeding lower two transfluxors. One winding of the pair of windings 132 is threaded from the $B^+$ supply in one sense, indicated by the circles, through the aperture 124 of the top transfluxor, and then, through the remainder of the apertures 124, reversing the sense of linkage for each succeeding lower transfluxor. The lower terminals of the four pairs of windings 129, 130, 131, and 132 are connected, respectively, to the anodes of the four pairs of duo-triode tubes 134, 136, 138 and 140. The tube cathodes are connected to a common ground. A bias winding 128 is threaded from the $B^+$ supply in the one sense, as indicated by the circles, through the bias aperture 126 of each of the transfluxors. The lower terminal of the bias winding 128 is connected to the fixed terminal of a single-pole, single-throw switch 141. The arm of the switch 141 is connected in series with a current-limiting resistor 142 to ground. An A.C. winding 144 is threaded through the output aperture 143 of each of the transfluxors 120. The terminals of the winding 144 are connected to a suitable source (not shown) of A.C. current. An individual output winding 145 is threaded through each output aperture 143 of each of the transfluxors. Each output winding 145 may be connected to any device capable of utilizing the output voltage induced in an output winding.

In operation, the switch 141 is closed, then opened to provide a positive-current pulse in the winding 128. The positive-current pulse establishes a clockwise flux with reference to the output aperture 143 in the common portion adjacent the bias aperture 126 in the respective transfluxors 120. Input signals are applied to the grids of each of the duo-triodes 134, 136, 138 and 140 in a manner to render one triode of each duo-triode conductive and the other non-conductive. A current flow in a winding which links the flux path in the one sense, indicated by a circle, causes a positive magnetizing force of one-half the intensity which is required to saturate the adjacent common portion in the clockwise sense with reference to the output aperture. A current flow in a winding which links the flux path in the opposite sense, indicated by the two X's, causes a negative magnetizing force of an intensity sufficient to cancel the positive magnetizing force and to establish a saturating flux in the adjacent common portion in the counterclockwise sense with reference to the output aperture. For example, assume that a combination of input signals is applied to the control grids of the duo-triodes to render the left-hand side of each conductive. In such case, only the top transfluxor 120 receives two clockwise flux-producing current pulses in each of the apertures 122 and 124. Thus, a saturating flux in the clockwise sense with reference to output aperture 143 is established in all three common portions of the output aperture flux path of the top transfluxor 120. The remaining transfluxors have a counterclockwise saturating flux with reference to the output aperture in either one or two of their common portions. There are three different possibilities of current flow through each of the apertures 122 and 124, with reference to the output aperture 143, as follows: (1) Both currents tending to produce a clockwise flux in the adjacent common portion, the magnitude of the flux due to each being taken as $+1/2$, the total flux being taken as $+1$; (2) One current tending to produce a clockwise flux of magnitude $+1/2$ and the other a counterclockwise flux of $-3/2$, the total being taken as $-1$; (3) Both currents tending to produce a counterclockwise flux of magnitude $-3/2$ in the adjacent common portion, the total being taken as $-3$.

Thus, only one transfluxor is selected for each combination of input signals, because each of the remaining transfluxors has at least one common portion saturated with flux in the counterclockwise sense with reference to its output aperture.

By using sixty-four, four-input transfluxors and providing two different pairs of input windings in three of the four apertures and a biasing winding in the fourth aperture, it is possible to select one out of the sixty-four transfluxors for each phase of the A.C. signal for each combination of input signals applied to the six different pairs of input windings. By using transfluxors with six input apertures and providing two different pairs of input windings in five of the six apertures, it is possible to select one out of 1024 transfluxors for each combination of input signals applied to the 10 input windings. In general, by providing $2^n$ multi-input transfluxors, each having $n$ input apertures and providing two pairs of input windings in each of $(n-1)$ input apertures, it is possible to select one out of the $2^n$ transfluxors for each combination of signals applied to the $2(n-1)$ input windings. In view of the foregoing, it is now apparent that other combinatorial schemes may be adapted for employment in the present invention.

The combinatorial switches of Figs. 8 and 10, Fig. 13 and Fig. 14, can also be considered coding devices, each of which operates from a binary code to a one-out-of-many unitary code. Further, any of these switches may be arranged to provide less than $2^n$ outputs for $n$ inputs by reducing the number of transfluxors in the switch.

In addition, the combinatorial switches may be arranged such that a different A.C. input winding is threaded through the output aperture of either all or selected ones of the transfluxors of the switch. In such case, one common output winding is threaded through the output aperture of each of the transfluxors of the switch. Thus, for any combination of input signals, an output signal is or is not induced in the common output winding, according to the setting of the common portions of the flux path about the output aperture of the transfluxor which is excited by the A.C. input signal.

*Summary*

Two design considerations are of particular importance in constructing a multi-aperture transfluxor. The first consideration is that the minimum cross-sectional area of the portion of material between the outer edge of an input aperture should be equal to the minimum cross-sectional area of the common portion between an input and the output aperture. The second consideration is that the minimum cross-sectional area between any two-input apertures should be no less than twice the minimum cross-sectional area of a common portion.

From the foregoing, it is clear that the various flower-like transfluxors of the present invention herein described are inexpensive, easily constructed, magnetic devices which can perform a variety of useful functions advantageously.

Examples of useful functions are as follows:

(*a*) The transfluxor of the present invention may function as an $n$-input, magnetic control circuit which operates under the control of $n$ setting current pulses. The setting pulses do not have to be furnished in any particular order. An input A.C. signal is controlled for an indefinite time without requiring additional circuitry or holding power. In particular, the transfluxor of the present invention may be considered an $n$-input magnetic "and" gate which can store an input signal for an indefinite period of time. Such an "and" gate is particularly suitable in asynchronous systems because it functions both as a storage register and as an "and" gate, thereby eliminating the requirement for additional storage devices. More than one input winding can be provided in each input aperture to provide a coincident-current device in respect to an individual input aperture.

(*b*) The transfluxor of the present invention may function as a code-conversion switch for converting an $n$-position binary code to a unitary code of one-out-of $2^n$ outputs. Either one or two outputs can be provided for any given code combination. By making one of the input apertures a bias aperture, one output can be obtained for any given code combination. By using all the input apertures for code conversion, one output can be obtained corresponding to a given code combination, and a different output obtained corresponding to the complement of the given code combination. By a proper consideration of the polarity of the input A.C. signal, or the output signal induced thereby in the output winding, it is possible to select only one out of $2^n$ transfluxors where all $n$-input apertures are used for code conversion.

It will be apparent to those skilled in the art that the transfluxor of the present invention can be used to perform functions in addition to those described herein.

What is claimed is:

1. A magnetic switch comprising a plurality of magnetic elements each including a magnetic material having the characteristics of being substantially saturated at remanence and each having a plurality of input apertures and an output aperture, separate flux paths in said material each about separate ones of said apertures, a different portion of the flux path about said output aperture being in common respectively with portions of the separate flux paths about said input apertures, and a plurality of input windings, said input windings being respectively threaded through corresponding ones of said input apertures in accordance with a desired combinatorial code.

2. A magnetic switch comprising a plurality of magnetic elements each comprising a body of magnetic material having the characteristic of being substantially saturated at remanence and each having a plurality of input apertures and an output aperture, a flux path about each of said apertures, certain portions of said flux path about said output aperture being in common respectively with portions of the flux paths about said input apertures, a plurality of input windings, said input windings being respectively threaded through corresponding ones of said input apertures of said elements in accordance with a desired combinatorial code, an A.C. winding threading said output aperture of each of said elements, an individual output winding threaded through each of said output apertures, and means to apply a current to selected ones of said input windings to establish a flux in a given sense in the flux path about the output aperture of only a selected one of said elements and to establish a flux in the sense opposite to the given sense in at least one portion of the flux path about the output aperture of the remaining ones of said elements.

3. A magnetic switch as recited in claim 1, wherein each of said input apertures has a different pair of input windings threaded therethrough.

4. A magnetic switch as recited in claim 1, wherein each of said input apertures has two different pairs of input windings threaded therethrough, one winding of each pair being threaded in one sense, and the other winding of a pair being threaded in the opposite sense.

5. A magnetic switch as recited in claim 1, wherein each of said input apertures has a plurality of different pairs of input windings threaded therethrough, one winding of each pair being threaded in one sense, and the other winding of a pair being threaded in the opposite sense.

6. A magnetic switch comprising a plurality of magnetic elements each comprising a magnetic material having the characteristic of being substantially saturated at remanence and each having a plurality of input apertures and an output aperture, a flux path about each of said apertures, the flux path about said output aperture having portions respectively in common with portions of the separate flux paths about said input apertures, a bias winding, and a plurality of input windings, said bias winding being threaded through a corresponding input aperture of each of said elements, and said input windings being respectively threaded through corresponding ones of the remaining input apertures in accordance with a desired combinatorial code.

7. A magnetic switch as recited in claim 6, including an A.C. winding and a plurality of output windings, said A.C. winding being threaded through said output aperture of each of said elements, and an individual output winding being threaded through each of said output apertures.

8. A magnetic switch as recited in claim 6, wherein each of said remaining input apertures has a different pair of said input windings threaded therethrough, one winding of each pair being threaded in one sense, and the other winding of a pair being threaded in the opposite sense.

9. A magnetic switch as recited in claim 6, wherein each of said remaining input apertures has two different pairs of said input windings threaded therethrough, one winding of each pair being threaded in one sense, and the other winding being threaded in the opposite sense, said other winding having a larger number of turns than said one winding.

10. A magnetic switch as recited in claim 6, wherein each of said remaining input apertures has $n$ different pairs of said input windings threaded therethrough, one winding of each pair being threaded in one sense, and the other winding of a pair being threaded in the opposite sense.

11. A magnetic switch as recited in claim 6, including means to apply a current to selected ones of said input windings to establish a flux flow in a given sense in the flux path about the output aperture of a selected one of said elements, and to establish flux in a sense opposite to the given sense in at least one portion of the flux path about the output aperture of each of the remaining elements.

12. A magnetic switch comprising a plurality of magnetic elements each comprising a magnetic material characterized by being substantially saturated at remanence and each having a plurality of input apertures and an output aperture, a separate flux path in said material about each of said apertures, the flux path about said output aperture having portions respectively in common with separate ones of the flux paths about said input apertures, and a plurality of pairs of input windings, each pair of said input windings being threaded through a different one of said input apertures of each of said elements in accordance with a desired combinatorial code, one of each said pair being threaded through an input aperture in one direction, and the other winding of said pair being threaded through the same said input aperture in the opposite direction, said pairs of windings each threading only one aperture of an element.

13. A magnetic switch as recited in claim 12, including an A.C. winding and a plurality of output windings, said A.C. winding being threaded serially through the output aperture of each of said elements, and a separate one of said output windings being threaded through a respective one of said output apertures.

14. A magnetic switch as recited in claim 12, including an output winding and a plurality of A.C. windings, said output winding being threaded serially through the output aperture of each of said elements, and a separate one of said A.C. windings being threaded through an individual one of said output apertures.

15. A magnetic switch comprising a plurality of magnetic elements each consisting of a magnetic material having the characteristic of being substantially saturated at remanence and each having a plurality of input apertures and an output aperture, each having an individual flux path in said material thereabout, the flux path about said output aperture having portions respectively in common with portions of the individual flux paths about said input apertures, a plurality of input windings, said input windings being respectively threaded through corresponding ones of said input apertures in accordance with a desired combinatorial code, an output winding, and a plurality of A.C. windings, said output winding being threaded serially through the output aperture of each of said elements, and a separate one of said A.C. windings being threaded through an individual one of said output apertures.

16. A magnetic switch comprising a plurality of magnetic elements each consisting of a magnetic material having the characteristic of being substantially saturated at remanence and each having a plurality of input apertures and an output aperture, a flux path about each of said apertures, certain portions of said flux path about said output aperture being respectively in common with portions of the flux paths about said input apertures, a bias winding, a plurality of input windings, said bias winding being threaded through a corresponding input aperture of each of said elements, said input windings being respectively threaded through corresponding ones of the remaining input apertures in accordance with a desired combinatorial code, an output winding and a plurality of A.C. windings, said output winding being threaded serially through the output aperture of each of the said elements, a separate one of said A.C. windings being threaded through an individual one of said output apertures, and means to apply a current to selected ones of said input windings to establish a flux in a given sense in the flux path about the output aperture of only a selected one of said elements and to establish a flux in the sense opposite to the given sense in at least one portion of the flux path about the output apertures of the remaining ones of said elements.

17. In a magnetic system, the combination comprising a plurality of magnetic cores each having apertures, each of said cores consisting of a magnetic material having the characteristic of being substantially saturated at remanence, a plurality of pairs of windings, said pairs of windings being threaded through certain of said apertures of said cores in accordance with a desired combinatorial code, an input and an output winding each threaded through other of said apertures than said certain apertures, and means for applying signals to one winding in each of said pairs of windings to produce a flux change in a desired one of said plurality of cores, whereby signals applied to said input winding are transmitted to the output winding of said desired core.

18. In a magnetic system, the combination comprising a plurality of magnetic cores each having apertures, each of said cores consisting of a magnetic material having the characteristic of being substantially saturated at remanence and having two response conditions, each of said cores being initially in one of said response conditions, a plurality of pairs of windings, each of said pairs of windings being linked to all of said cores in a desired combinatorial fashion, half of the windings of said pairs being linked to said cores in one sense and the other half of the windings of said pairs being linked to said cores in the opposite sense, an input winding linked to each of said cores, a plurality of output windings each linked to a different one of said cores, and means for selecting a desired one of said cores comprising means for applying selecting signals to all of the said windings that link said desired core in said one sense to change said desired core from said initial to the other of said response conditions, whereby signals applied to said input winding are transmitted only to the output winding of said desired core.

References Cited in the file of this patent

UNITED STATES PATENTS

| | | |
|---|---|---|
| 2,733,424 | Chen | Jan. 31, 1956 |
| 2,734,182 | Rajchman | Feb. 7, 1956 |

OTHER REFERENCES

Publication: "Magnetic-Matrix Switch Reads Binary Output" (Brean), Electronics, May 1954, pages 157–159 (pages 158–159 relied on).

Publication: "The Transfluxor" (Rajchman), Proceedings of the I.R.E., vol. 44, issue 3, March 1956, pages 321–332.